US007264257B2

(12) United States Patent
Sanders

(10) Patent No.: US 7,264,257 B2
(45) Date of Patent: Sep. 4, 2007

(54) FOLDING CYCLE

(76) Inventor: Mark Andrew Sanders, Axis House, 77a Imperial Road, Windsor, SL4 3RU (GB)

(*) Notice: Subject to any disclaimer, the term of this patent is extended or adjusted under 35 U.S.C. 154(b) by 106 days.

(21) Appl. No.: 10/530,521

(22) PCT Filed: Oct. 29, 2003

(86) PCT No.: PCT/EP03/11988

§ 371 (c)(1),
(2), (4) Date: Apr. 7, 2005

(87) PCT Pub. No.: WO2004/041631

PCT Pub. Date: May 21, 2004

(65) Prior Publication Data

US 2006/0175797 A1 Aug. 10, 2006

(30) Foreign Application Priority Data

Nov. 5, 2002 (GB) ................................ 0225809.3

(51) Int. Cl.
*B62K 19/00* (2006.01)

(52) U.S. Cl. ...................................... 280/278; 280/287

(58) Field of Classification Search ................ 280/287, 280/278

See application file for complete search history.

(56) References Cited

U.S. PATENT DOCUMENTS 3,905,618 A 9/1975 Miranda
3,979,136 A 9/1976 Lassiere
3,990,717 A 11/1976 Best
4,460,191 A * 7/1984 Ishibashi et al. ............ 280/287
4,566,713 A 1/1986 Hon
4,615,637 A 10/1986 Pelischek
4,895,386 A 1/1990 Hellestam et al.
5,052,706 A 10/1991 Tsai et al.
5,492,350 A 2/1996 Pan
6,032,971 A * 3/2000 Herder ........................ 280/278
6,286,848 B1 9/2001 Augustin
6,364,335 B1 * 4/2002 Mombelli ................... 280/287
2002/0053780 A1 * 5/2002 Weisz et al. ................ 280/287
2004/0032110 A1 * 2/2004 Bigot ......................... 280/287
2005/0121877 A1 * 6/2005 Groendal et al. ........... 280/287

FOREIGN PATENT DOCUMENTS

| | | |
|---|---|---|
| DE | 26 51 305 A1 | 5/1978 |
| DE | 100 37 801 A1 | 2/2002 |
| EP | 0 012 604 A | 6/1980 |
| EP | 0 505 598 A1 | 9/1992 |
| EP | 1 407 961 A1 | 4/2004 |
| GB | 115840 A | 0/1900 |
| GB | 2 021 055 A | 11/1979 |
| GB | 2 309 015 A | 7/1997 |
| JP | 10-119861 A | 5/1998 |
| WO | WO-99/42356 A | 8/1999 |
| WO | WO-02/051697 A1 | 7/2002 |

* cited by examiner

*Primary Examiner*—Lesley D. Morris
*Assistant Examiner*—Marc A. Scharich

(57) ABSTRACT

There is provided a frame assembly for a foldable cycle. The assembly has a rear frame portion including a mounting for a rear wheel; a forward frame portion, hingedly connecting to the rear frame portion such that the two are foldable towards each other; and hingedly connecting to the forward frame portion, a pivot assembly for a mounting arm including a mounting for a forward wheel. On folding of the cycle, hinged movement of the pivot assembly relative to the forward frame portion moves the mounting arm to move the forward wheel mounting relative to the forward frame portion. The rear frame portion and pivot assembly are coupled such that folding of the frame portions towards each other results in the distance between the forward frame portion and forward wheel mounting extending relative to each other.

23 Claims, 12 Drawing Sheets

146
140
130
132
120
150

FOLDING CYCLE

FIELD OF THE INVENTION

The present invention relates to a folding cycle which is readily and reversibly foldable from an 'in use' configuration to a compact 'folded' configuration.

BACKGROUND OF THE INVENTION

Whilst folding cycles are well known in the art, there exist a number of design challenges that are the continuing interest of designers in this field. In particular, it is desirable that the 'folded' configuration of the cycle is of minimal size and of a configuration that accommodates its carrying and/or storage. That configuration desirably also minimises the number of sharp or irregularly-shaped components protruding therefrom, which might otherwise snag on the user causing annoyance and/or minor injury.

It is desirable from a space-saving standpoint, that when in the 'folded' configuration, the wheels of the cycle are in close relationship, preferably in registration, with each other. It is particularly desirable, that when so registered the wheels are freely rotatable to enable the 'folded' cycle to be wheeled about by the user thereby avoiding any carrying thereof. Once such wheelable folded cycle is described in UK Patent Application No. 2,171, 656 A1, although this design necessitates the use of small cycle wheels that are less preferred from a user standpoint. For example, smaller wheels can give poorer performance over rough surfaces (e.g. potholes and off-road use). Some users also find small-wheeled cycles more difficult to handle.

SUMMARY OF THE INVENTION

The present invention provides a frame for a folding cycle accommodating 'normal' sized wheels that is readily and conveniently foldable from an 'in use' configuration to a 'folded' configuration in which the wheels are in close relationship. In a preferred aspect, the wheels are brought into registration as a result of folding the frame thereby enabling the folded cycle to be wheeled about by the user, and avoiding the user having to carry the folded cycle. The invention derives from the applicant's appreciation that to achieve an optimal relationship between the (normal-sized) wheels in the 'folded' configuration it is necessary, on moving from the 'in use' configuration, to introduce a spacing step which increases the distance between the front wheel and forward foldable frame portion such that on folding an optimal (e.g. registration) relationship between the front and rear wheels is achievable.

The present invention also provides coupling between the 'spacing' and 'frame folding' actions such that both may be conducted in tandem, thereby reducing the number of user steps required to fold the cycle from the 'in use' to the compact and optimally, wheelable 'folded' configuration.

According to one aspect of the present invention there is provided a frame assembly for a foldable cycle comprising a rear frame portion including a mounting for a rear wheel;

a forward frame portion, hingedly connecting to said rear frame portion such that the two are foldable towards each other; and hingedly connecting to said forward frame portion, a pivot assembly for a mounting arm, said mounting arm including a mounting for a forward wheel, wherein the rear frame portion and pivot assembly are coupled such that on folding of the frame portions towards each other hinged movement of said pivot assembly relative to the forward frame portion moves said mounting arm to increase the spacing between the forward frame portion and the forward wheel mounting.

On folding of the frame portions towards each other, hinged movement of the pivot assembly relative to the forward frame portion moves the mounting arm to move the forward wheel mounting relative to the forward frame portion. The rear frame portion and pivot assembly are coupled such that said folding results in the spacing (i.e. distance) between the forward frame portion and forward wheel mounting increasing (i.e. extending) relative to each other.

The present invention provides a foldable cycle and a frame assembly therefor. The cycle may take any form including town bike, mountain bike, leisure bike, children's bike and racing cycle.

It will be appreciated that in fully assembled form the cycle will include wheels, a seat, pedals, a drive mechanism (e.g. crank-drive) and handlebars mounted to the frame. It will also however, be appreciated that it is common to supply cycles in part-assembled form including, at the simplest level, just the frame to which various sub-components are later mounted.

The cycle herein is foldable. That is to say, it has generally two configurations comprising an 'in use' configuration in which it may be put to its cycling function by a user and a 'folded configuration' in which it is folded away ready for carrying, wheeling and/or storage by the user. As will become apparent from the later description, the term 'folded configuration' includes both a fully folded configuration, in which all relevant parts are fully folded away (e.g. for storage) and a mainly folded configuration, in which the mounting arm and/or handlebars protrude to assist in wheeling thereof.

The term 'frame assembly' herein is used to mean the basic frame for the foldable cycle absent the mounting arm (e.g. dual fork or mono-fork shaped) for the forward wheel. The term 'frame and forward wheel mounting assembly' is used to denote the combination of the 'frame assembly' and forward wheel 'mounting arm'. Wheels, pedals, seat, handlebars and other sub-components are securable to these assemblies by generally known methods.

The rear frame portion includes a mounting for a rear wheel. Suitably, it also defines a mounting for pedals, a crank drive and a seat. In spatial terms, the rear frame portion generally defines a principal plane. Suitably, in use, the rear wheel rotates within that principal plane or within a plane that is coplanar therewith.

The forward frame portion hingedly connects to said rear frame portion such that the two are foldable towards each other. Suitably, the forward and rear frame portions folded close up against each other to minimise the space requirements of the 'folded' configuration. In aspects, abutting and mating engagements relationships are envisaged. In the 'in use' configuration, it will be appreciated that the forward frame portion generally lies within the principal plane defined by the rear wheel frame.

A pivot assembly hingedly connects (e.g. via a hinge) to the forward frame portion. The pivot assembly is arranged for pivotable (e.g. rotatable) mounting of a mounting arm that includes a mounting for a forward wheel.

The above-described hinge connection of the forward and rear frame portions to each other and of the pivot assembly to the forward frame portion are generally achieved with structurally stiff (e.g. in torsion and bending) hinges. In aspects, this is achievable by the use of wide-spaced hinge bearings and interlocking features that engage at defined hinge positions (e.g. 'in use' position).

The mounting arm includes a mounting for a forward wheel. Suitably, the mounting arm also includes a mounting for handlebars, which may have any suitable configuration. It will be appreciated that in the 'in use' configuration, the pivot axis defined by the pivot assembly lies within the principal plane defined by the rear frame portion.

On folding of the cycle, hinged movement of the pivot assembly relative to the forward frame portion moves it (e.g. forwards or outwards in a relative sense) preferably such that when a mounting arm is pivotally mounted thereto the distance (i.e. spacing) between the forward frame portion and the forward wheel mounting is increased. This is an important aspect of the invention herein because without this movement and spacing action the front wheel mounting is not sufficiently spaced to allow for optimal positioning thereof in the 'folded' configuration.

Preferably, the (e.g. forwards or outwards) movement places sufficient distance (i.e. spacing) between the forward wheel mounting and forward frame portion such that the act of folding the frame portions towards each other will result in the forward and rear wheel mountings being brought generally into registration with each other. This represents an optimal 'folded' configuration since the wheel mountings (and hence wheels mounted thereto) lie side-by-side. An advantage of this optimal configuration is that the folded cycle may be readily wheeled about both wheels, each of which rotates about the same rotational axis (i.e. wheel axles aligned). In essence, the two wheels side-by-side function as a 'single wheel'. An advantage of this functional aspect is that unlike many other full-sized wheel folding cycles the front wheel does not have to be removed to achieve neat folding.

The rear frame portion and pivot assembly are coupled such that folding of the forward and rear frame portions towards each other results in the position of the forward frame portion and forward wheel mounting moving, and preferably extending (i.e. increasing spacing) relative to each other. The coupling may be achieved by any suitable coupling means including one or more coupling arms having either a simple or more tailored form.

The above described coupling enables the 'frame folding' and 'spacing' actions to be conducted in tandem, thereby reducing the complexity and number of steps required to move the cycle from the 'in use' to 'folded' configuration and vice-versa. In one aspect, as the folding motion is conducted the coupling acts to push the forward wheel mounting out and around the frame portions thereby avoiding undesirable interaction with any sub-components of the frame, particularly the pedals and/or crank drive.

Most preferably, the extension (spacing) will be to the optimal position described above in which the complete folding action results in the forward and rear wheel mountings being brought into registration with each other.

The coupling may be provided by any suitable means such as one or more suitably co-mounted coupling elements of preferably rigid form such as a single or multi-bar coupling rod.

In one aspect, the coupling is arranged to have adjustable length. For example, threaded screw adjusters may be provided to enable fine adjustment of the length of the coupling for maximum effectiveness and/or steering axis angle adjustment and/or alignment of the front and rear axles.

In another aspect, the coupling is provided with a tensioner arranged such that tension is provided to the hinge connecting the forward and rear frame portions when in the 'in use' configuration. In part, the tensioner functions to counter the 'normal riding forces' experienced by the coupling 'in use'. The tensioned coupling thereby acts to provide force to hold the hinge fast and tightly closed. The tensioned coupling thereby acts to provide force to hold the hinge fast and in place. This force must be overcome before the hinge can be opened thereby provides for enhanced strength of the hinged connection when 'in use' by a rider.

The tensioner for the coupling may in aspects be provided by a suitable spring or other resilient element(s), anywhere in the system or at the endstops to movement. In one embodiment the spring is mounted within the coupling (e.g. within a sleeve of a coupling rod). In one particular aspect, a coupling rod is provided with a hard sprung piston mechanism comprising an outer sleeve shaped respectively to receive an inner bayonet sleeve and a central piston together with internal spring. In use, the sprung piston mechanism enables travel of the inner bayonet sleeve relative to the outer sleeve wherein this travel is constrained by the action of the spring.

In alternatives, the tensionser for the coupling is supplemented with or replaced by a spring or other resilient element located at another part of the folding mechanism. Or the mechanism itself is made springy or resilient. In particular, resilience or springiness could be incorporated at coupling mountings, hinge mountings, the front and rear frame portions, pivot assembly and any stops provided to travel. The overall functional objective would be to provide an 'over centre' action, as described in more detail below.

In another aspect, a reversible locking mechanism is provided to reversibly lock the rear and forward frame portions in the 'in use' (i.e. hinge closed) position. Suitably, the locking mechanism is arranged such that when released it can function as an extendible (i.e. variable length) coupling between the rear and forward frame portions. Suitably, that extendible coupling co-operates with the main coupling during the action of folding of the rear and forward frame portions towards each other (e.g. acting as a guide mechanism).

Suitably, the frame assembly is arranged such that the pivot assembly enables the mounting arm to rotate therein such as to accommodate folding of the frame portions. Suitably, the mounting arm is moved to an optimal position to enable the accommodation of the mounting arm in the 'folded' configuration.

In one aspect herein, on folding, hinged movement of the pivot assembly relative to the forward frame portion moves said mounting arm such that the distance between the forward and rear wheel mountings extends. That is to say, the wheelbase is lengthened as a consequence of the folding action. In another preferred aspect herein, the wheelbase is not lengthened as a consequence of the folding action because as the forward wheel mounting moves away from the forward frame portion, both of these are simultaneously guided rearward under the action of the main hinge (between forward and rear frame portions).

The mounting arm is generally provided with handlebars (e.g. on a stem mounting). Suitably, on folding, the pivot assembly acts such as to enable the mounting arm with handlebars to rotate therein such as to readily accommodate the arm and handlebars on folding of the frame portions. Suitably, the handlebars or stem mounting therefor are moved to a position that enables their optimal location in the 'folded' configuration.

In one aspect, in the 'folded' configuration, the handlebars or stem mounting therefor are located such as to function as a handle for wheeling about the folded cycle by way of the wheels (in a side-by-side configuration). In other aspects, other parts of the frame assembly or one or more further additional features provide this handle function.

In aspects, any handle is foldable, retractable, rotatable, or otherwise movable to an optimum position (e.g. ergonomic) for ease of wheeling of the folded cycle by a user. Suitably, this movement of the handle to an optimum position may be coupled to the overall folding action.

One or more of the hinges or of the coupling or locking elements described above may use an 'over-centre' action such that there is a spring bias which arises either from the hinge/coupling geometry or by the use of spring elements. The spring bias may be to either or both ends of the folding action. Such spring bias may in aspects, be employed to assist the folding or unfolding action. In other aspects, it may be employed to bias the frame to the 'folded' or 'unfolded' configurations.

Suitably, the forward and rear wheel mountings herein take the form of single-sided 'mono-fork' mountings, although more traditional dual-fork mountings may also be employed. The advantage of using 'mono-fork' mountings is that the wheels are enabled to locate nearer to each other in the 'folded' configuration, thereby further saving space. It will be appreciated that where 'mono-forks' mountings are employed the forward and rear wheel mountings will be arranged as a mating pair to enable close wheel location on folding. Where traditional 'dual fork' mountings are used the front wheel may remain in parallel with the forward frame portion and not rotate 1800 about the steering axis.

Suspension systems may be provided to any wheel mountings.

Suitably, the hubs of the wheels may lock lightly or more engagedly together in the 'folded' configuration. One or more latches may be provided thereto or elsewhere on the frame of any suitable form including magnetic latches, mechanical latches, sprung latches, interference fit latches, retracting ball latches, press-stud latches and Velcro (trade name) type latches.

The wheels of the cycle may be arranged to be removable on folding, thereby further reducing the size of the 'folded' configuration.

The wheels may have any suitable size. It is an advantage of the present invention that 'normal-sized' wheels (e.g. 60 to 75 cm) are readily accommodated as opposed to the 'mini-sized' wheels (e.g. <45 cm) of many fold up bikes.

The rear wheel frame portion is generally provided with a mounting for a seat stem upon which a seat is accommodated. The seat stem is suitably adjustable in both up/down and back/forward senses and may be provided with various locking mechanisms. In aspects, the seat stem retraction or removal may be independent or it may be coupled in some way to the main folding action.

In one aspect, the frame assembly is provided with an energy storage device capable of releasing power to assist the folding or unfolding action. Examples of such devices include compressed air devices, electrical devices, stored spring energy devices, batteries and servomotors.

In aspects, the handlebars and/or stem mounting therefore may retract or be removable. The retraction or removal thereof may be independent or it may be linked or coupled in some way to the cycle folding action.

The frame assembly and any additional components of the foldable cycle may be made from any suitable material including metals, woods, composites, plastic polymeric materials and any combinations thereof. Suitably, materials are selected for their low-weight, stiffness and robustness properties.

The frame assembly may additionally be provided with other features such as stands, luggage carriers, combined luggage carriers/stands, enclosures and motor powering (e.g. electric motor).

According to another aspect of the present invention, there is provided a frame and forward wheel mounting assembly for a foldable cycle comprising a rear frame portion including a mounting for a rear wheel;

a forward frame portion, hingedly connecting to said rear frame portion such that the two are foldable towards each other;

hingedly connecting to said forward frame portion, a pivot assembly for a mounting arm; and pivotally connecting to said pivot assembly, a mounting arm including a mounting for a forward wheel wherein the rear frame portion and pivot assembly are coupled such that on folding of the frame portions towards each other hinged movement of said pivot assembly relative to the forward frame portion moves said mounting arm to increase the spacing between the forward frame portion and the forward wheel mounting.

On folding, hinged movement of said pivot assembly relative to the forward frame portion moves said mounting arm to move the forward wheel mounting relative to the forward frame portion. The rear frame portion and pivot assembly are coupled such that folding of the frame portions towards each other results in the spacing (i.e. distance) between the forward frame portion and forward wheel mounting extending relative to each other.

In essence, the frame and forward wheel mounting assembly comprises the frame assembly described hereinbefore in combination with the mounting arm for the forward wheel.

According to a further aspect of the present invention there is provided a frame assembly for a foldable cycle comprising a rear frame portion including a mounting for a rear wheel; a forward frame portion, hingedly connecting to said rear frame portion such that the two are foldable towards each other; and hingedly connecting to said forward frame portion, a pivot assembly for a mounting arm, said mounting arm including a mounting for a forward wheel, wherein the rear frame portion and pivot assembly are coupled by a coupling that is provided with a tensioner for providing tension to said hinged connection between the forward and rear frame portions.

Suitably, the tensioner comprises a resilient element. Suitably, said resilient element comprises a spring.

Preferably, the tensioner acts to provide an over centre action.

Preferably, the resilient element locates within a cavity defined by the coupling.

In one aspect, the coupling is provided with a hard sprung piston mechanism comprising an outer sleeve shaped respectively to receive an inner bayonet sleeve and a central piston together with internal spring, wherein the sprung piston mechanism enables travel of the inner bayonet sleeve relative to the outer sleeve which travel is constrained by the action of the spring.

According to a further aspect of the present invention there is provided a frame assembly for a foldable cycle comprising a rear frame portion including a mounting for a rear wheel; a forward frame portion, hingedly connecting to said rear frame portion such that the two are foldable towards each other; and a lock for reversibly locking the rear and forward frame portions together in a hinge closed position, wherein said lock is arranged to provide an over centre locking action.

According to a further aspect of the present invention there is provided a foldable cycle comprising the frame and forward wheel mounting and additionally forward and rear wheels; handlebars; a drive mechanism; and a seat. Optionally, gearing may be provided to the drive mechanism.

According to other aspects of the present invention there are provided methods for folding and unfolding the frame assembly and frame and forward wheel mounting assembly described herein from an 'in use' to 'folded' configuration.

Embodiments of the present invention will now be described with reference to the accompanying drawings in which:

BRIEF DESCRIPTION OF THE DRAWINGS

FIG. 3*a* shows the 'in use' configuration; FIG. 3*b* shows the cycle in an early stage of folding up; FIG. 3*c* shows the cycle in a later stage of un-folding; FIG. 3*d* shows the cycle in a partially 'folded' configuration;

FIG. 3*a*) and in the partially 'folded' configuration (c.f. FIG. 3*d*);

FIG. 3*a*); in an early stage of folding up (c.f. FIG. 3*b*); and in a later stage of un-folding (c.f. FIG. 3*c*);

DETAILED DESCRIPTION OF THE INVENTION

Figure 1A:
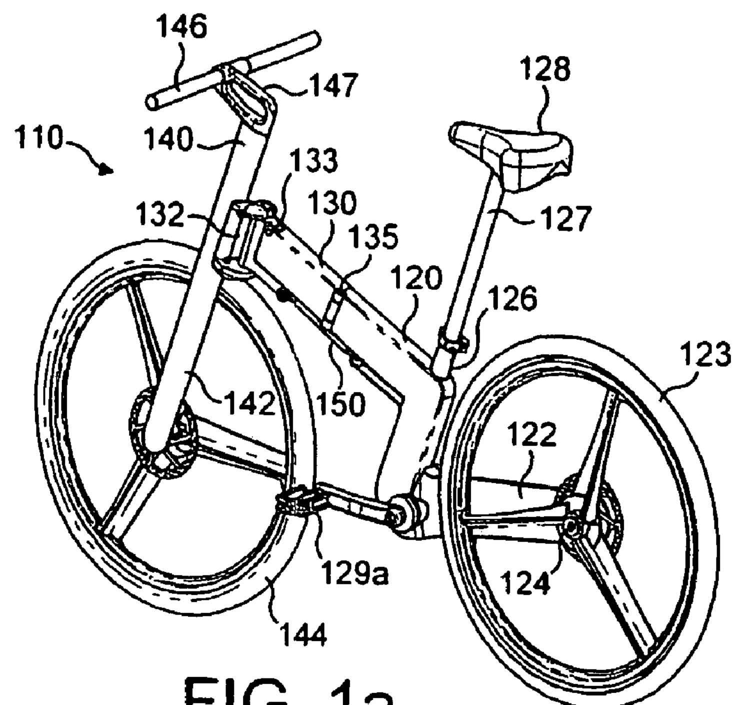
FIGS. 1*a* to 1*f* show perspective views of a first folding cycle herein in various stages as the cycle is folded up from the 'in use' configuration (FIG. 1*a*) to the 'folded' configuration (FIG. 1*f*)
Figure 1B:
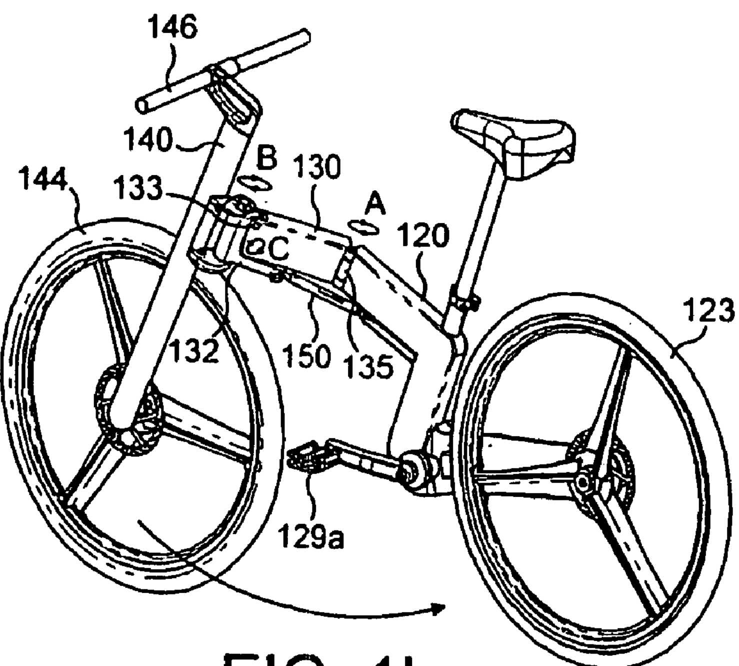
Figure 1C:
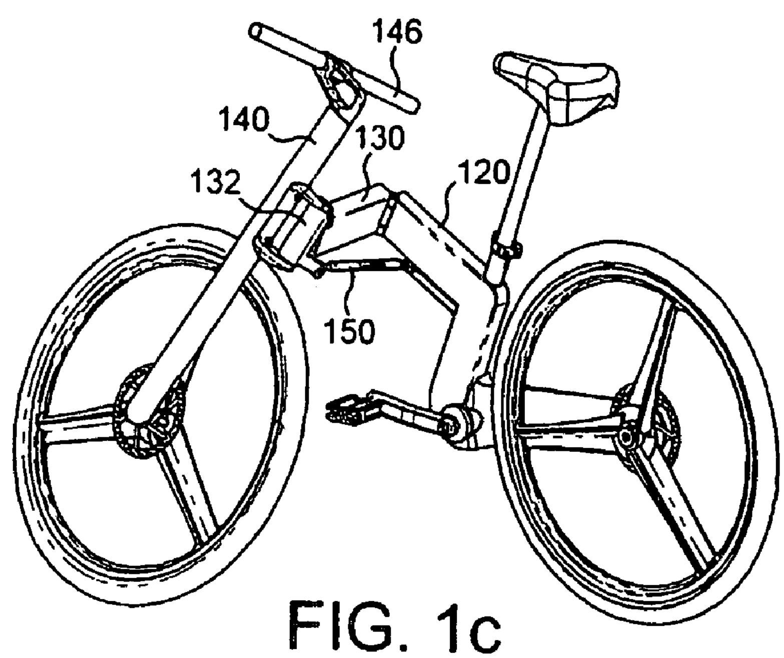
Figure 1D:
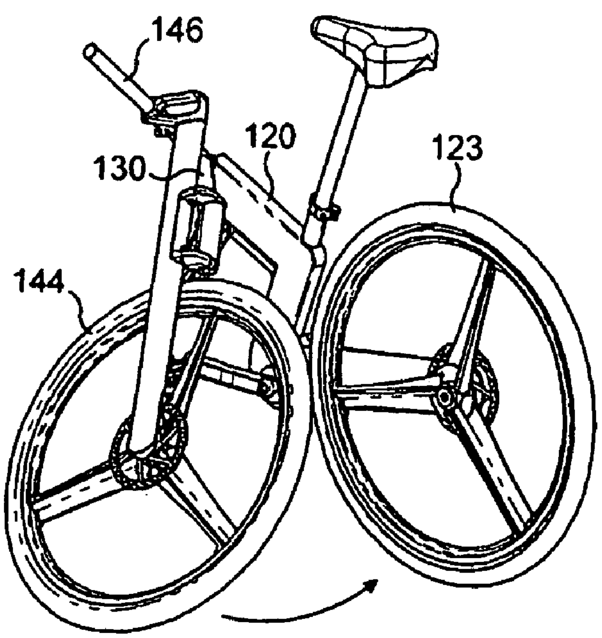
Figure 1E:
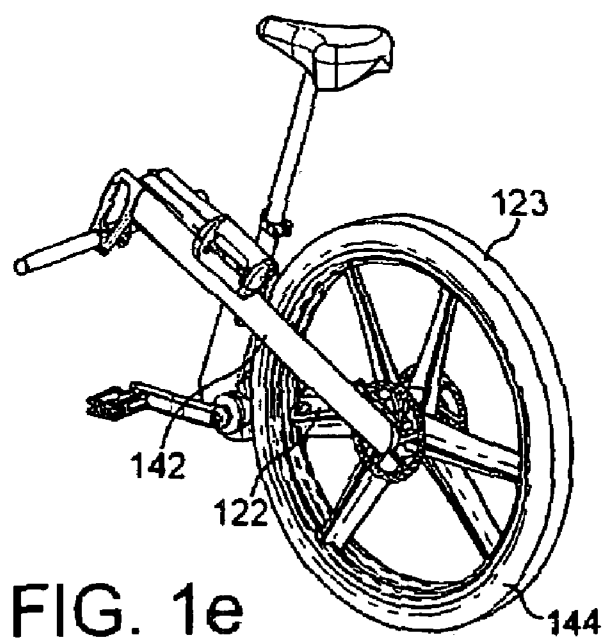
Figure 1F:
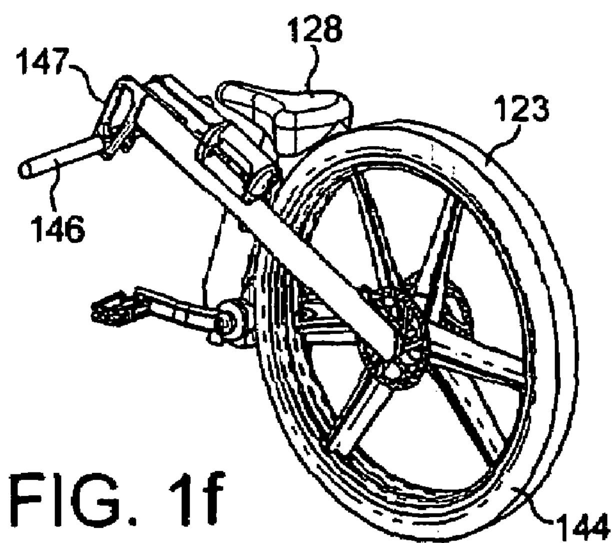

Referring now to the drawings, in FIGS. 1*a* to 1*f* there is shown a folding cycle 110 herein in which a coupling is provided to guide the folding action. Various stages are shown as the cycle is folded up from the 'in use' configuration (FIG. 1*a*) to the fully 'folded' configuration (FIG. 1*f*). For ease of reference and understanding, not all parts are labelled in every drawing, but only the most important parts in relation to the action at that stage of the folding up process.

As may be seen in FIG. 1*a*, the folding cycle 110 comprises a rear frame portion 120 and a front frame portion 130 that are hingedly joined by stiff folding hinge 135 in order that the two frame portions 120, 130 may be folded towards each other. The rear frame portion 120 is also provided with rear wheel mounting 122 in 'mono fork' form to which rear wheel 123 is fixed at a hub 124. Also provided to the rear frame portion is a seat stem mounting 126 which receives an adjustable seat stem 127 and a seat 128. Further provided to the rear frame portion are pedals 129*a* (one only visible) which drive a crank which in turn is provided with a chain, a belt, a shaft (not visible) or other means for driving a rear wheel 123. The front frame portion 130 is provided with a pivot assembly 132 to which it hingedly connects via a hinge 133 which allows for hinged motion thereof about a horizontal axis. A coupling rod 150 is fixed to both the rear frame portion 120 and the assembly 132 to provide a coupling therebetween. Mounting arm 140 pivotally connects to the pivot assembly 132. The mounting arm is provided with handlebars 146 on a stem mounting 147 and a 'mono-fork' form wheel mounting 142 for a front wheel 144 that connects thereto at a hub (not visible). The pivot assembly 132 enables rotational movement of the mounting arm 140 and front wheel 144, stem mounting 147 and handlebars 146 that are associated therewith.

FIG. 1*b* shows a first stage of the folding action. At a folding hinge 135, the rear frame portion 120 and front frame portion 130 hingedly move towards each other (motion A). At pivot assembly 132, the mounting arm 140 is rotated clockwise (motion B) such that the wheels 123, 144 remain approximately parallel and the handlebars 146 are moved out and away from the folding parts. At the hinge 133, the mounting arm 140 hingedly rotates upwards (motion C) in response to the action of a coupling rod 150 acting on the pivot assembly 132 such that the front wheel 144 is initially pushed generally forwards and the handlebars 146 initially move backwards. It will thus, be appreciated that three separate coupled motions are occurring as the frame portions 120, 130 folded together, the net effect of which is to increase the distance (spacing) between the front wheel 144 and forward frame portion 130 and push the front wheel 144 and mounting arm 140 out of the way of the folding action, and in particular away from the pedals 129*a*. In this example, the distance between the rear and front wheels 123, 144 does not increase because although the mounting arm 140 rotates upwards about the hinge 133 (motion C) it is also rotating clockwise (motion B) and backwards (motion A) and the net effect of these combined actions is that the wheelbase is marginally reduced during the initial part of the folding action. The coupling rod 150 is fixed to both rear frame portion 120 at a first attachment point and pivot assembly 132 at a second attachment point to provide a coupling there between.

In subsequent stage, FIG. 1*c* the three coupled aspects of the folding action are continued further. The rear frame portion 120 and front frame portion 130 hingedly are moved further towards each other. The mounting arm 140 is further rotated clockwise such that the handlebars 146 are moved further out and away from the folding parts. The mounting arm 140 is also further rotated upwards in response to the action of coupling rod 150 acting on the hinged pivot assembly 132 such that the front wheel 144 is pushed out and around.

In FIG. 1*d*, both the rear frame portion 120 and front frame portion 130 and the rear and front wheels 123, 144 are respectively brought into mating relationships with each other. The handlebars 146 remain positioned well away from the folding path.

In FIG. 1*e*, the front 144 and rear 123 wheels are in registration with each other. The respective 'mono fork' mountings 122, 142 are located exterior to the wheels 123, 144 and can then act as a barrier (or part-barrier) to user contact with the wheel hubs and transmission (not visible).

In FIG. 1*f*, the fully 'folded' configuration, the seat 128 is retracted (e.g. manually or automatically) and the stem mounting 147 to the handlebars 146 may be seen to protrude thereby providing an effective handle 147 for wheeling the folded form about the wheels 123, 144.

It will be appreciated that in the first (FIGS. 1*a* to 1*f*) folding cycle described above, the 'spacing' and 'folding' actions are combined whereby the front wheel 144 when being brought into the folded position is generally parallel to the rear wheel 123, and is pushed out side ways to clear a pedal 129*a* and crank and then automatically guided to lie alongside the rear wheel 123.

In essence, in the context of the first folding cycle (FIGS. 1*a* to 1*f*), the coupling rod 150 links the 'spacing' and 'folding' actions such that the initial spacing of the front wheel mounting arm 140 and forward frame portion 130 is 'absorbed' into the rest of the actions. In aspects, axis of motion B (which can also be the steering axis) allows the front wheel 144 to remain parallel to the rear wheel 123, and during the folding action allows approx 180 degrees of rotation (of pivot assembly 132). The handlebars 146 clear the frame during the folding action and importantly the front wheel 144 is guided to move alongside the rear wheel 123 thereby clearing the left-hand pedal 129*a*/crank assembly.

Figure 2:
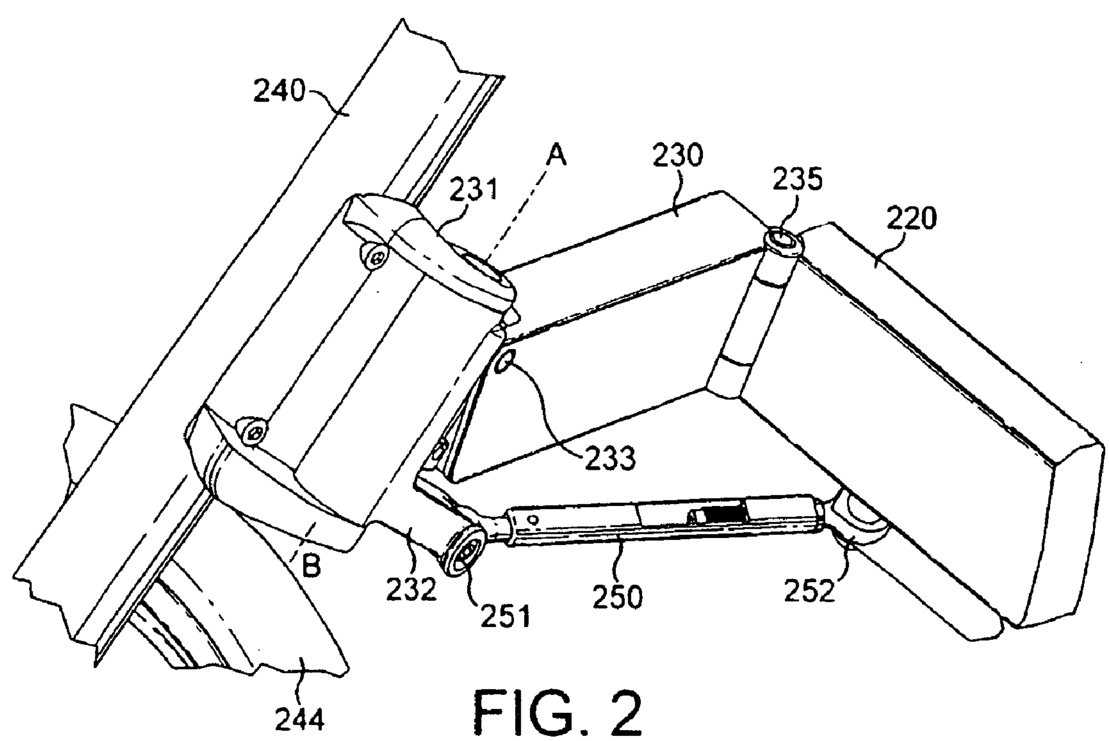
FIG. 2 shows a perspective view of a detail of a coupled folding mechanism herein.

FIG. 2 shows a detailed view of coupled folding mechanism herein, which for example, could be employed in the folding cycle of FIGS. 1*a* to 1*f*.

A stiff folding hinge 235 hingedly joins foldable rear 220 and front 230 frame portions. A pivot assembly 232 joins to the front frame portion by way of hinge 233, which enables the pivot assembly 232 to be hingedly moved relative to the forward frame portion 230 in a plane of movement defined by the hinge 233. This plane of movement generally corresponds to the (forward) plane defined by the forward frame portion 230. The pivot assembly 232 is also provided with a pivot mounting 231 for mounting arm 240, which enables axial rotation of the mounting arm 240 about axis AB as shown. The mounting arm 240 has a front wheel 244 and handlebars (not visible) attached, and this axial rotation thereby enables steering of the cycle.

A coupling rod 250 joins to rear frame portion 220 at a first attachment point 252 and a pivot assembly 232 at second attachment point 251. It may thus, be appreciated that any movement of the forward frame portion 230, rear frame portion 220 and pivot assembly 232 will be coupled.

The representation of FIG. 2 shows the coupled folding mechanism in a part-folded configuration in which the forward frame portion 230 has been moved towards the rear frame portion 220. As a result of this movement, the coupling rod 250 has acted to push the pivot assembly 232 away from the forward frame portion 230, the pivot assembly 232 moving about hinge 233. The front wheel 244 on mounting arm 240 is thereby pushed out and away from the folding action.

Figure 4A:
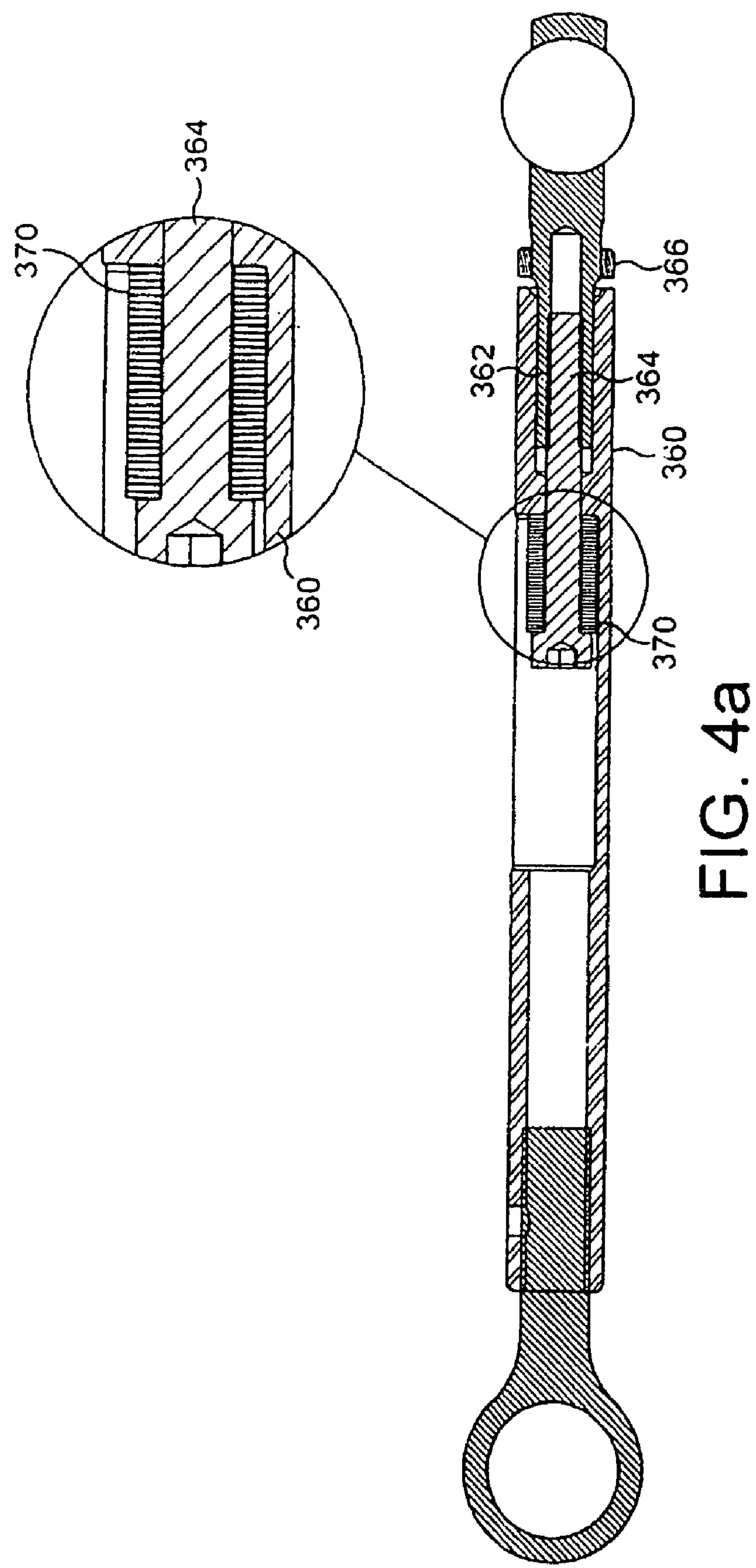
FIGS. 4*a* and 4*b* show cross-sectional views of the coupling rod of the second coupled folding mechanism of FIGS. 3*a* to 3*d* in the 'in use' configuration (c.f.
Figure 4B:
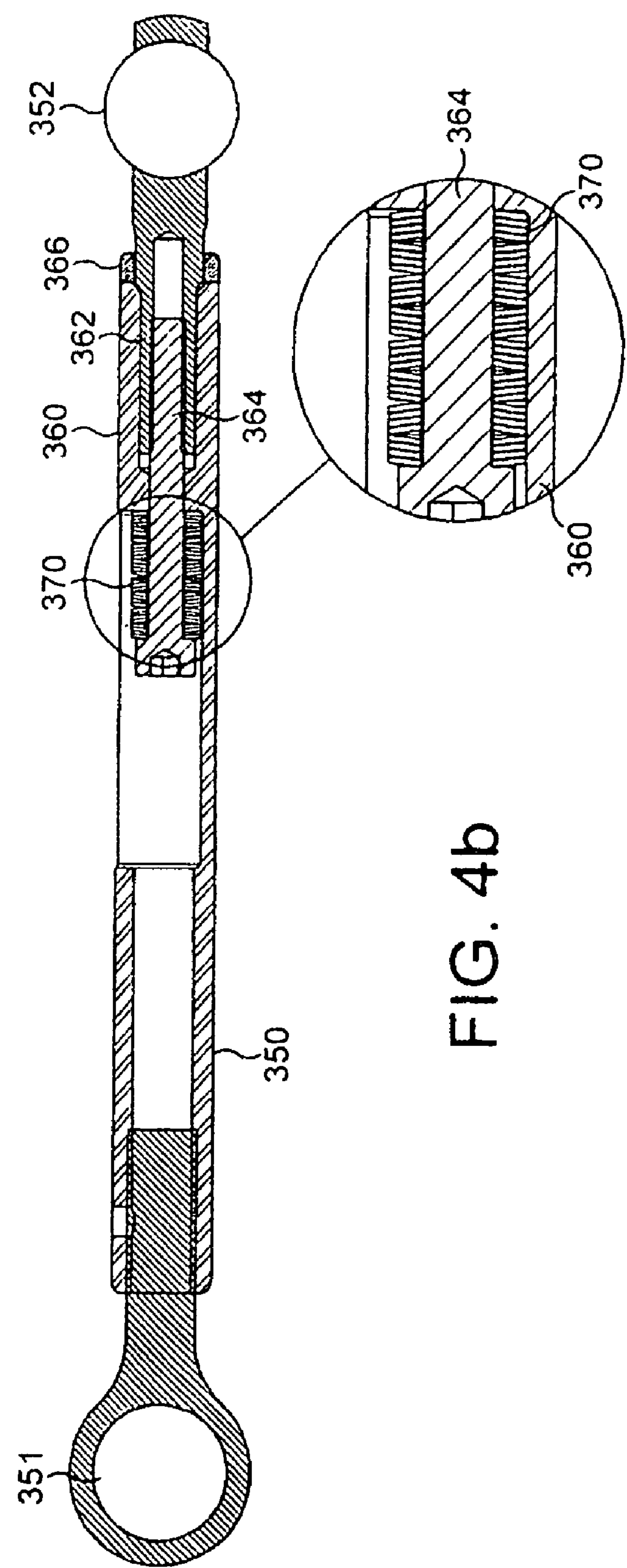
Figure 5A:
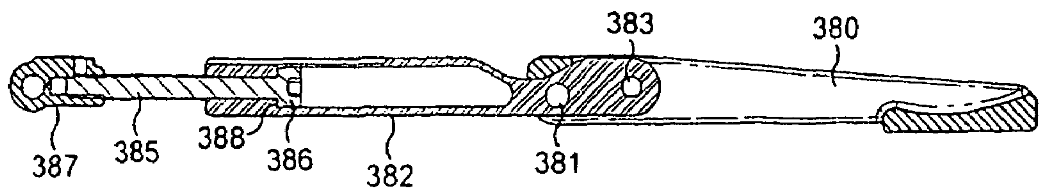
FIGS. 5*a* to 5*c* show cross-sectional views of the locking mechanism of the second coupled folding mechanism of FIGS. 3*a* to 3*d* in the 'in use' configuration (c.f.
Figure 5B:
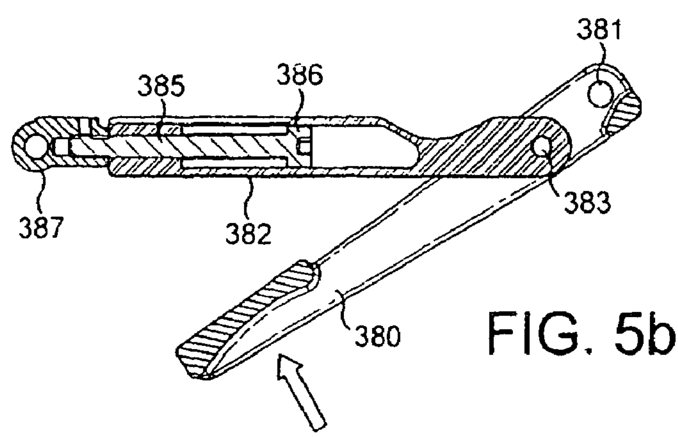
Figure 5C:
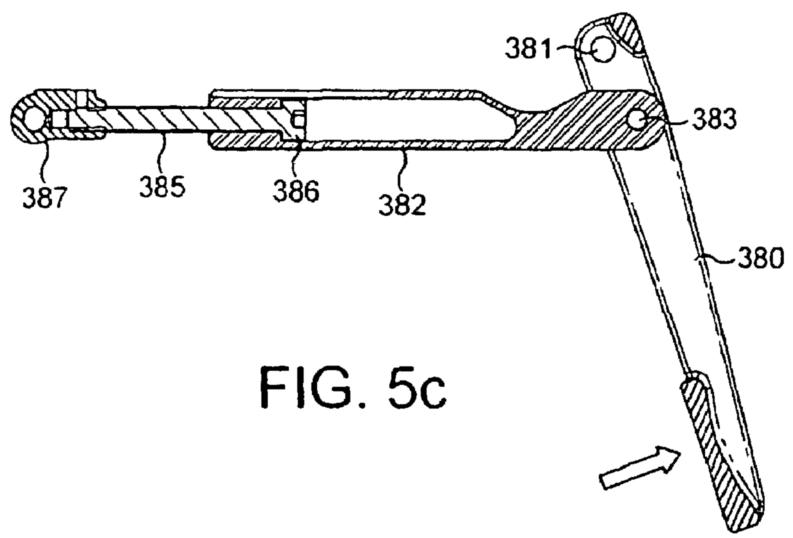

FIGS. 3*a* to 3*d* show various perspective views, generally of the underside, of a second coupled folding mechanism, which for example, could be employed in the folding cycle of FIGS. 1*a* to 1*f*. This second coupled folding mechanism employs an internally sprung coupling rod as shown in FIGS. 4*a* and 4*b* in sectional views and a locking mechanism as shown in FIGS. 5*a* to 5*c* in sectional views.

Figure 3A:
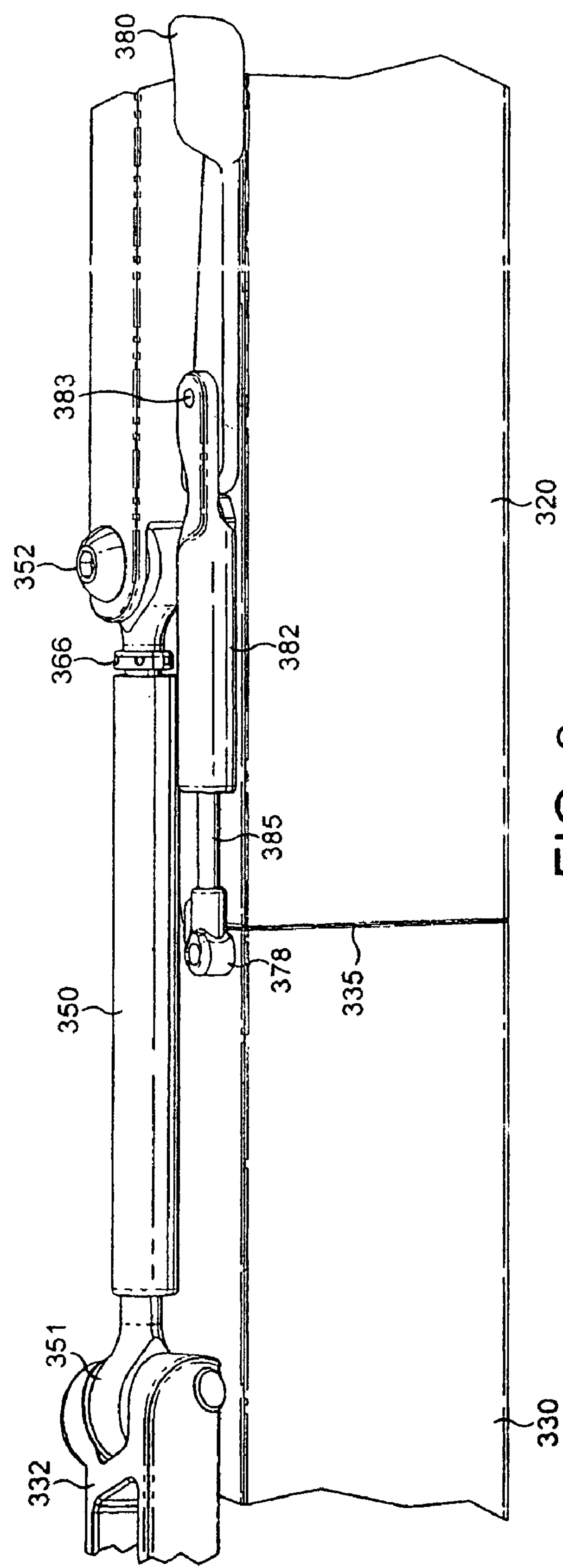
FIGS. 3*a* to 3*d* show perspective views of a second coupled folding mechanism for use with a folding cycle herein in different stages of folding/unfolding.
Figure 3B:
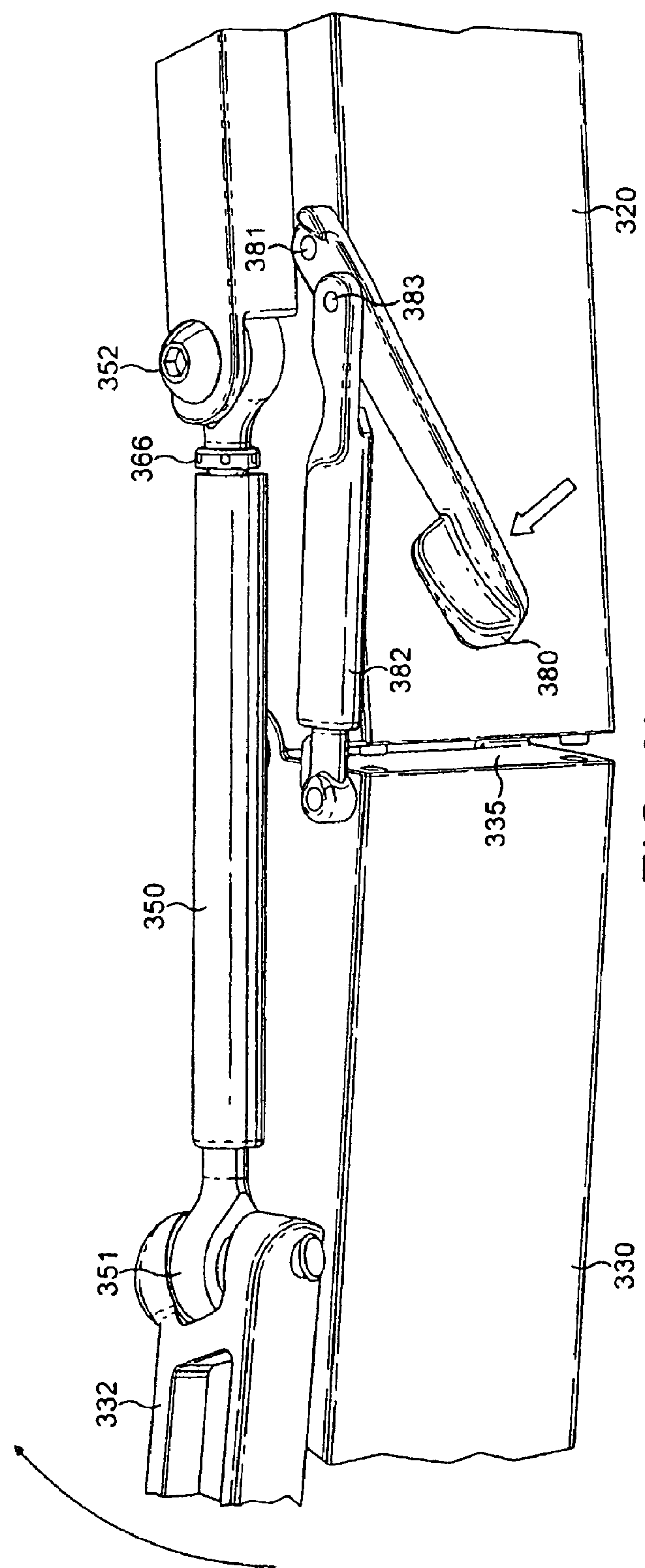
Figure 3C:
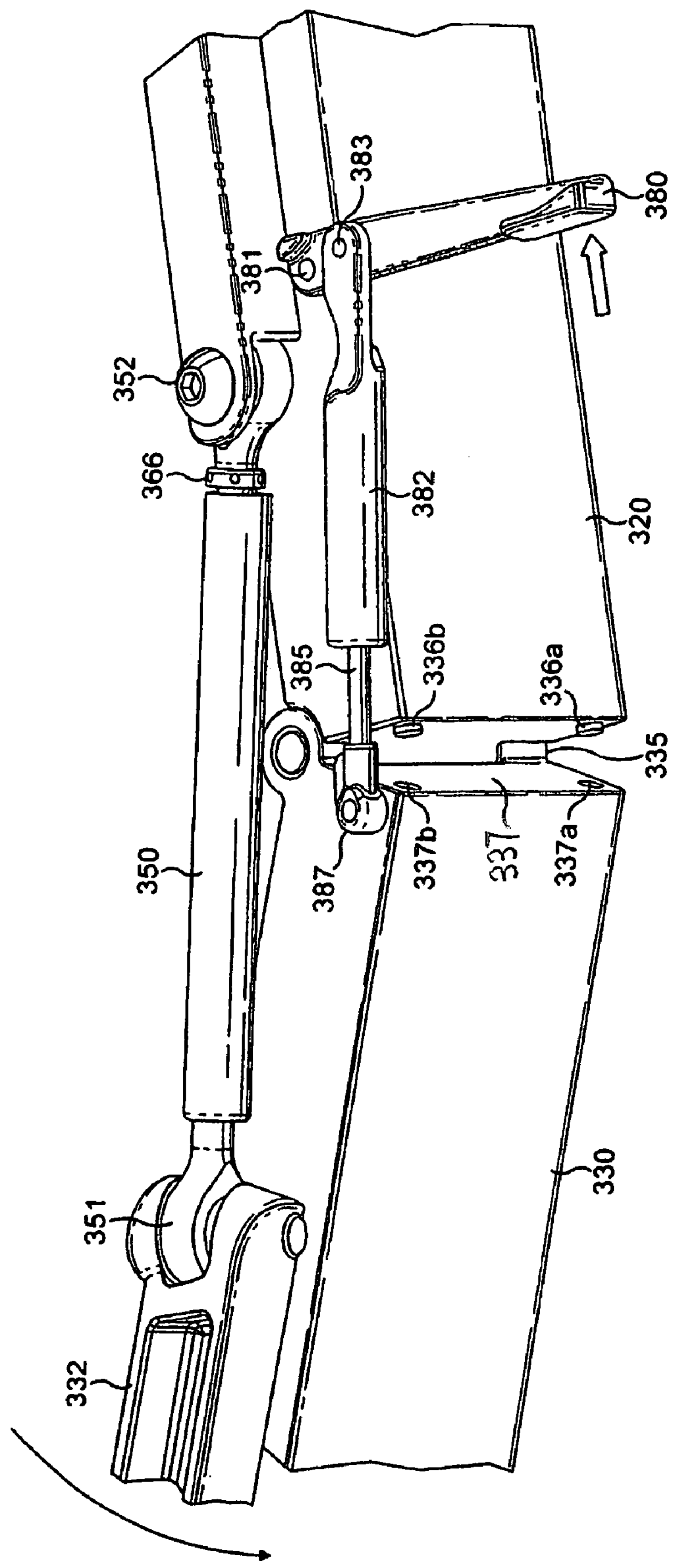
Figure 3D:
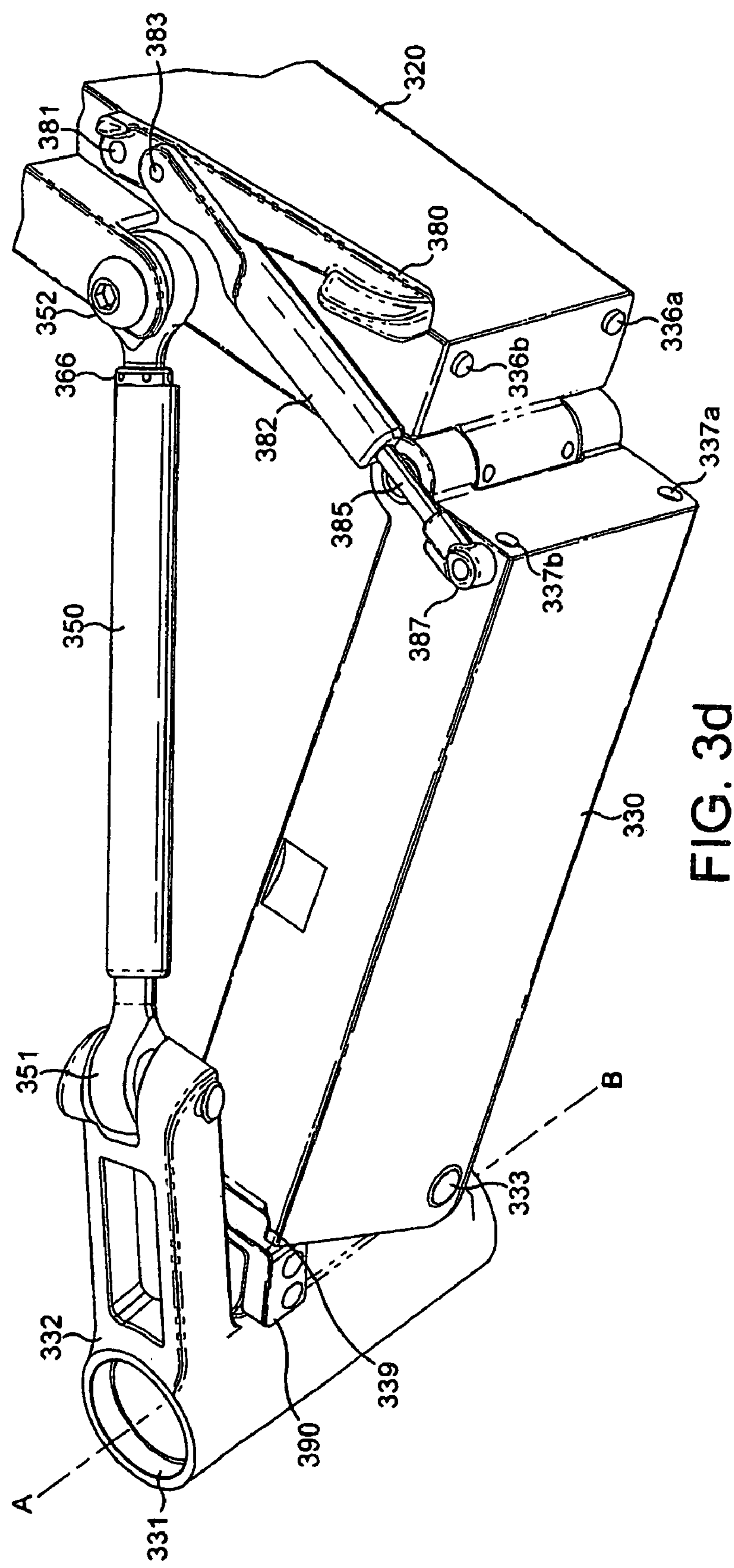

FIGS. 3*a* to 3*d* show the second coupled folding mechanism in different stages of folding/unfolding. FIG. 3*a* shows the 'in use' configuration. FIG. 3*b* shows the cycle in an early stage of folding up. FIG. 3*c* shows the cycle in a later stage of unfolding. FIG. 3*d* shows the cycle in a partially 'folded' configuration.

Referring now to FIGS. 3*a* to 3*d*, a stiff folding hinge 335 hingedly joins foldable rear 320 and front 330 frame portions. A pivot assembly 332 (wholly visible in FIG. 3*d* only) joins to the front frame portion by way of a hinge 333 (visible in FIG. 3*d* only), which enables the pivot assembly 332 to be hingedly moved relative to the forward frame portion 330 in a plane of movement defined by the hinge 333. This plane of movement generally corresponds to the (forward) plane defined by the forward frame portion 330. The pivot assembly 332 is also provided with a pivot mounting 331 (visible in FIG. 3*d* only) for mounting arm (not shown), which enables axial rotation of a mounting arm about axis AB as shown. When present, the mounting arm will have front wheel and handlebars attached, and this axial rotation thereby enables steering of the cycle.

A coupling rod 350 joins to rear frame portion 320 at first attachment point 352 and pivot assembly 332 at second attachment point 351. It may thus, be appreciated that any movement of the forward frame portion 330, rear frame portion 320 and pivot assembly 332 will be coupled. In the 'partially folded' configuration of FIG. 3*d* as a result of this movement, the coupling rod 350 has acted to push the pivot assembly 332 away from the forward frame portion 330, the pivot assembly 332 moving about hinge 333. It may therefore be appreciated that (e.g. as in FIG. 2) the front wheel on a mounting arm mounted at the pivot mounting 331 would thereby pushed out and away (i.e. spaced) from the folding action.

In another aspect (visible in FIG. 3*d* only), a block 390 of resilient material is attached over a projection on the pivot assembly 332. The block 390 has a small angled 'wedging fit' into a matching recess 339 in the front of the forward frame portion 330. The combination of the small angled 'wedging action' and choice of suitable resilient material (e.g. a slightly compressible, slippery material such as nylon) gives a very tight joint, free of movement when the cycle is in riding mode. In variations, similar nylon covered wedges are used at the main hinge 335 as part of, or instead of the circular pegs 336*a*, 336*b* and holes 337*a*, 337*b* shown. The action of the internally sprung coupling rod of the second coupled folding mechanism will now be described with reference to both FIGS. 3*a* to 3*d* and FIGS. 4*a* and 4*b*.

In the 'in use' configuration (of FIGS. 3*a* and 4*a*) the coupling rod 350 is arranged to sit 'over-centre' past the axis defined by folding hinge 335 thereby providing additional force to hold the main hinge 335 closed. This force is designed to increase as the cycle is loaded up and going over rough surfaces to make the coupling, principally defined by the main hinge 335 very safe and stable.

To achieve the 'over centring' action the coupling rod 350 is provided with a hard sprung piston mechanism comprising an outer sleeve 360 shaped respectively to receive an inner bayonet sleeve 362 and a central piston 364 together with an internal spring 370. In use, the sprung piston mechanism enables travel of the inner bayonet sleeve 362 relative to the outer sleeve 360 wherein this travel is constrained by the action of the spring 370 and also, in extremis by stop ring 366 provided to the inner bayonet sleeve 362. Overall, the length of the coupling rod 350 may therefore be varied in a restricted way. The spring 370 is selected to be a high rate, high pretension force and low travel spring. As may be seen in FIG. 4*a*, the spring 370 comprises an array of multiple disc springs, some discs in series and some in parallel.

In the 'in use' configuration of FIG. 4*a* the coupling rod 350 is slightly extended (i.e. the inner bayonet sleeve 362 is slightly withdrawn from the outer sleeve 360) and the spring 370 is compressed. This compression force at the spring 370 acts to maintain closing force on the hinge 335.

In early stage of folding up shown in FIG. 4*b* the coupling rod 350 is not extended (i.e. the inner bayonet sleeve 362 sits further within the outer sleeve 360) and the spring 370 has only any 'pre-tensioning' compression force acting on it.

In variations herein, the spring 370 is mounted on a headed screw (or similar) with plane shaft to enable adjustment of any pre-tension at the spring and/or the maximum permissible spring compression.

In another detail, the minimum length of the coupling rod 350 is arranged to be variable and set by adjustment of the position of the stop ring 366, which is for example threaded. In variations, two threaded stop rings 366 may be provided so that they can be locked together. Adjusting the minimum coupling rod 350 length can also be arranged to adjust the relative alignment of the front and rear axles, when the cycle is folded.

The action of the locking mechanism of the second coupled folding mechanism will now be described with reference to both FIGS. 3*a* to 3*d* and FIGS. 5*a* to 5*c*.

It will be appreciated that the principal function of the locking mechanism is to keep the main hinge 335 firmly closed when the cycle is in the 'in use' configuration (FIG. 3*a*; FIG. 5*a*). In this configuration, the locking mechanism assembly in tension and in an over centre position, which keeps it closed and slightly recessed into the frame.

In more detail, the locking mechanism comprises lever 380 pivotally mounted to rear frame portion 320 at first pivot point 381 and also pivotally connecting to a sleeved rod 382 at a second pivot point 383. The sleeved rod 383 receives a piston 385 having a retaining head 386 at the received end and a pivoting mounting 387 at the other end for pivotal mounting thereof to the forward frame portion 330. In one variation, the piston 385 may comprise a headed screw with plane shaft for adjustability.

It will be appreciated that in general terms, the locking mechanism is actuable by movement of the lever 380 from the locked position (FIG. 5*a*) in which it sits essentially co-axial with the sleeved rod 382 to an unlocked position (e.g. FIG. 5*c*) where the lever 380 sits at an angle relative to the sleeved rod 382. In one variation, the lock/unlock motion can be spring loaded by an extension spring which acts such as to 'snap' the lever 380 out from the locked to an operating position, and which makes operating it to overcome the 'over centre' action of the coupling 350 more easy.

In more detail, in the locked position of FIG. 5*a* the lever 380, the sleeved rod 382 and piston 385 rest co-axial relative to each other. The piston 385 is withdrawn from the sleeved rod 382 such that its head 386 abuts a retaining lip 388 thereof.

In an early stage of folding up as shown in FIGS. 3*b* and 5*b*, the lever 380 defines an angle of about 30.degree. relative to the sleeved rod 382 and piston 385. The piston 385 is generally received within the sleeved rod 382 such that its head 386 is well away from the retaining lip 388. In more detail, FIGS. 3*b* and 5*b* show the instant that the main hinge 335 is pushed open past the 'over centre' position. To achieve this a force is applied to push lever 380 towards frame 320 (i.e. as shown by the thick arrows) and the main hinge 335. This force is transmitted via the sleeved rod 382 (in compression) and pivoting mounting 387 to the front frame portion 330.

In a later stage of un-folding as shown in FIGS. 3*c* and 5*c*, the lever 380 defines an angle of about 110.degree. relative to the sleeved rod 382 and piston 385. The piston 385 is again withdrawn from the sleeved rod 382 such that its head 386 abuts a retaining lip 388 thereof. This withdrawal of the piston 385 occurs because as the hinge 335 opens up the forward frame portion 330 and pivot mounting 337 located thereon pulls away from the rear frame portion 320 and lever 380 mounted thereto. In more detail, FIGS. 3*c* and 5*c* show the position of the various parts just before the main hinge 335 is forced 'over centre' into the hinge 335 closed mode (i.e. 'in-use' configuration). Force is applied to the lever 380 in the direction as shown by the thick arrows. The force is transmitted via the sleeved rod 382 and piston 385 (both in tension) and the pivoting mounting 387 to the front frame portion 330, thereby acting to close the hinge 335 by forcing it 'over centre'.

Overall, in an unlocking action, the lever 380 is rotated in a clockwise sense. The applied force is amplified by the leverage (about 8:1) of the lever 380 on the other parts 382, 385 and 387. This forces the main hinge 335 open, which pushes the coupling rod 350 to past the hinge 335 axis and 'over centre'. The 'over centre' action, once the coupling rod 350 axis passes the hinge 335 axis, tends to open the hinge 335 further. This happens as the compressed spring 370 array in the coupling rod 350 expands and so further opening of the main hinge 335 is assisted. The action is much like that of a light switch or other over centre devices.

In a locking action, the forward 330 and rear 320 frame portions are firstly brought into mating alignment (i.e. as shown in FIG. 3*a*). The lever 380 is then rotated in an anti-clockwise sense. The applied force is amplified by the leverage (about 8:1) of the lever to bring lever 380, sleeved rod 382 and piston 385 into co-axial alignment relative to each other and to withdraw the piston 385 from the sleeved rod 382 such that its head 386 abuts a retaining lip 388 thereof. The applied force also acts such as to push the coupling rod 350 into its 'in use' position in which the internal spring is compressed (see description of FIG. 4*a*).

The second coupled folding mechanism employs an internally sprung coupling rod. It will be appreciated that in alternatives thereto, other elements of the coupling rod, other parts of the mechanism or endstops, may be sprung or otherwise tensioned to provide the desired 'over centring' action. In variations, spring elements may be used to place lever 380 into a useful position to be gripped by the user.

Figure 6A:
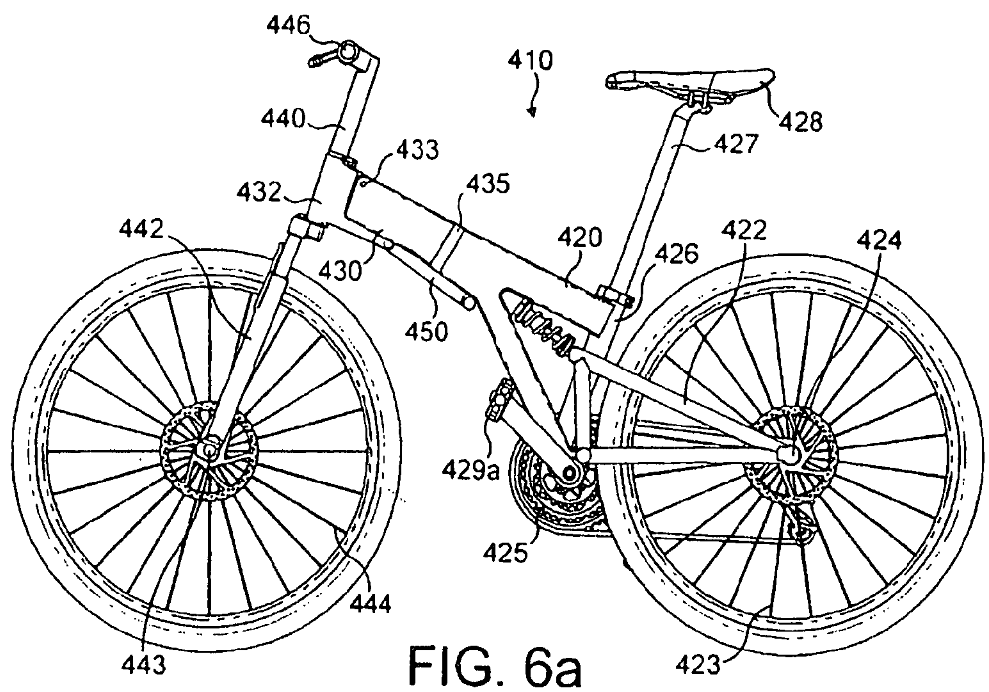
FIGS. 6*a* to 6*c* show side views of a second folding cycle herein in the form of a mountain bike in various stages as the cycle is folded up from the 'in use' configuration (FIG. 6*a*) to the compact 'folded' configuration (FIG. 6*c*).
Figure 6B:
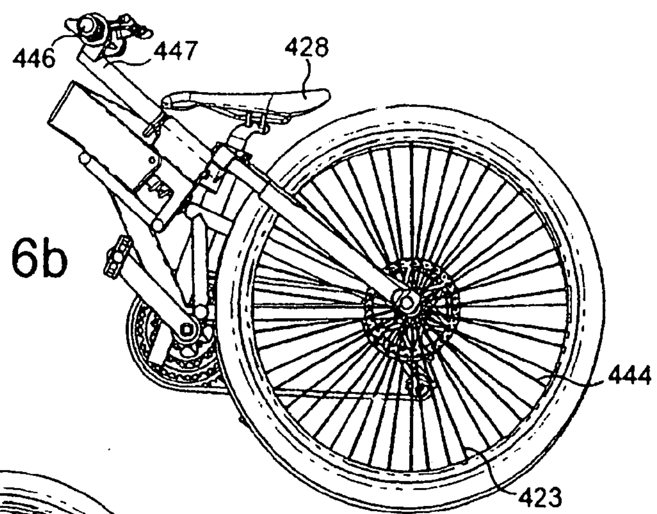
Figure 6C:
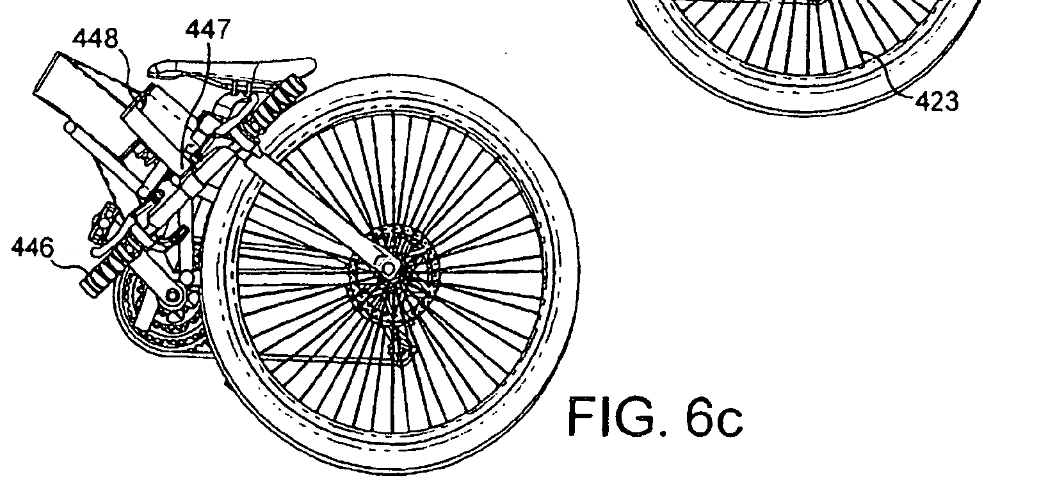

In FIGS. 6*a* to 6*c* there is shown a folding cycle 410 herein in the form of a mountain bike. Various stages are shown as the cycle is folded up from the 'in use' configuration (FIG. 6*a*) to the 'wheelable' configuration (FIG. 6*b*) to the fully compact 'folded' configuration (FIG. 6*c*). For ease of reference and understanding, not all parts are labelled in every drawing, but only the most important parts in relation to the action at that stage of the folding up process.

As may be seen in FIG. 6*a*, the folding cycle 410 comprises a rear frame portion 420 and a front frame portion 430 that are hingedly joined by a stiff folding hinge 435 in order that the two frame portions 420, 430 may be folded towards each other. The rear frame portion 420 is also provided with a rear wheel mounting 422 in conventional dual fork form to which a rear spoked wheel 423 is fixed at a hub 424. Also provided to the rear frame portion 420 is a seat stem mounting 426 that receives an adjustable seat stem 427 and a seat 428. Further provided to the rear frame portion are pedals 429*a* (only one visible) that drive a crank 425, which in turn is provided with a transmission for driving rear wheel 423. The front frame portion 430 is provided with pivot assembly 432 to which it hingedly connects via hinge 433 that allows for hinged motion thereof about a horizontal axis. Coupling rod 450 is fixed to both rear frame portion 420 and pivot assembly 432 to provide a coupling therebetween. An mounting arm 440 pivotally connects to a pivot assembly 432. The mounting arm is provided with a handlebars 446 on a stem mounting 447 and a conventional dual-fork form wheel mounting 442 for a front wheel 444 that connects thereto at a hub 443. The pivot assembly 432 enables rotational movement of the mounting arm 440 and a front wheel 444, a stem mounting 447 and a handlebars 446 that are associated therewith.

In FIG. 6*b*, the 'folded' but wheelable configuration, the seat 428 is retracted (e.g. manually or automatically) and the stem mounting 447 to the handlebars 446 may be seen to protrude thereby providing an effective handle for wheeling the folded form about the wheels 423, 444.

In FIG. 6*c*, the compact 'folded' configuration, the stem mounting 447 to the handlebars 446 may be seen to fold into the assembly about an oblique hinge 448 such that the handlebars 446 nest in compact fashion. Such hinged handlebar 446 assemblies are known in the art of folding cycles. In other embodiments, foldable handlebars (e.g. where only parts of the handlebars fold) are employed to achieve minimum compacted volume without moving the handlebar mounting stem 447.

The invention claimed is:

1. A frame assembly for a foldable cycle comprising a rear frame portion including a mounting for a rear wheel; a forward frame portion, hingedly connecting to said rear frame portion such that the two frame portions are foldable towards each other; and hingedly connecting to said forward frame portion, a pivot assembly for a mounting arm, said mounting arm including a mounting for a forward wheel, wherein the rear frame portion and pivot assembly are coupled such that when folding the frame portions towards each other, hinged movement of said pivot assembly relative to the forward frame portion moves said mounting arm to increase spacing between the forward frame portion and the forward wheel mounting; and wherein the rear frame portion and pivot assembly are coupled by a coupling comprising one or more rigid coupling elements, wherein the coupling is of adjustable length.

2. The frame assembly according to claim 1, wherein the coupling is provided with one or more threaded screw adjusters to enable fine adjustment of the length thereof.

3. The frame assembly according to claim 1, wherein the coupling is provided with a tensioner for providing tension to said hinged connection between the forward and rear frame portions.

4. The frame assembly according to claim 3, wherein said tensioner comprises a resilient element.

5. The frame assembly according to claim 4, wherein said resilient element comprises a spring.

6. The frame assembly according to claim 4, wherein said resilient element acts to provide an over centre action.

7. The frame assembly according to claim 4, wherein said resilient element locates within a cavity defined by the coupling.

8. The frame assembly according to claim 7, wherein the coupling is provided with a hard sprung piston mechanism comprising an outer sleeve shaped respectively to receive an inner bayonet sleeve and a central piston together with an internal spring, wherein the sprung piston mechanism enables travel of the inner bayonet sleeve relative to the outer sleeve which travel is constrained by an action of the spring.

9. The frame assembly according to claim 1, additionally comprising a lock for reversibly locking the rear and forward frame portions together in a hinge closed position.

10. The frame assembly according to claim 9, wherein said lock additionally includes a variable length coupling between the rear and forward frame portions.

11. The frame assembly according to claim 10, wherein said variable length coupling co-operates with the coupling when folding of the rear and forward frame portions towards each other.

12. The frame assembly according to claim 9, wherein said lock is arranged to provide an over centre locking action.

13. The frame assembly according to claim 1, wherein when folding the frame portions towards each other, the coupling acts to push the forward wheel mounting out and around the forward and rear frame portions.

14. The frame assembly according to claim 1, wherein the rear frame portion is provided with an adjustable mounting for a seat stem.

15. A frame and forward wheel mounting assembly for a foldable cycle comprising a frame assembly, wherein the frame assembly comprises a rear frame portion including a mounting for a rear wheel; a forward frame portion, hingedly connecting to said rear frame portion such that the two frame portions are foldable towards each other; and hingedly connecting to said forward frame portion, a pivot assembly for a mounting arm, said mounting arm including a mounting for a forward wheel, wherein the rear frame portion and pivot assembly are coupled such that when folding the frame portions towards each other, hinged movement of said pivot assembly relative to the forward frame portion moves said mounting arm to increase spacing between the forward frame portion and the forward wheel mounting.

16. A foldable cycle comprising the frame and forward wheel mounting assembly according to claim 15, further comprising forward and rear wheels attached respectively to said forward and rear wheel mountings; handlebars attached to the mounting arm; and a seat stem attached to the rear frame portion for receipt of a seat and a drive mechanism for said rear wheel.

17. The foldable cycle according to claim 16, wherein the forward and rear wheels are of diameter from 60 cm to 75 cm.

18. A frame assembly for a foldable cycle comprising a rear frame portion including a mounting for a rear wheel; a forward frame portion, hingedly connecting to said rear frame portion such that the two frame portions are foldable towards each other; and hingedly connecting to said forward frame portion, a pivot assembly for a mounting arm, said mounting arm including a mounting for a forward wheel, wherein the rear frame portion and pivot assembly are coupled by a coupling that is provided with a tensioner for providing tension to said hinged connection between the forward and rear frame portions.

19. The frame assembly according to claim 18, wherein said tensioner comprises a resilient element.

20. The frame assembly according to claim 19, wherein said resilient element locates within a cavity defined by the coupling.

21. The frame assembly according to claim 20, wherein the coupling is provided with a hard sprung piston mechanism comprising an outer sleeve shaped respectively to receive an inner bayonet sleeve and, a central piston together with an internal spring, wherein the sprung piston mechanism enables travel of the inner bayonet sleeve relative to the outer sleeve which travel is constrained by an action of the spring.

22. The frame assembly according to claim 19, wherein said resilient element comprises a spring.

23. The frame assembly according to claim 19, wherein said resilient element is arranged to provide an over centre action.

* * * * *